US011131796B2

(12) United States Patent
Bartlett et al.

(10) Patent No.: US 11,131,796 B2
(45) Date of Patent: Sep. 28, 2021

(54) OPTICAL DISPLAY WITH SPATIAL LIGHT MODULATOR

(71) Applicant: Texas Instruments Incorporated, Dallas, TX (US)

(72) Inventors: Terry Alan Bartlett, Dallas, TX (US); Stephen Aldridge Shaw, Plano, TX (US); Vivek Kumar Thakur, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/428,680

(22) Filed: May 31, 2019

(65) Prior Publication Data

US 2020/0081176 A1  Mar. 12, 2020

Related U.S. Application Data

(60) Provisional application No. 62/729,202, filed on Sep. 10, 2018.

(51) Int. Cl.
| F21V 8/00 | (2006.01) |
| G02B 3/00 | (2006.01) |
| G02B 27/14 | (2006.01) |

(52) U.S. Cl.
CPC ......... G02B 6/0016 (2013.01); G02B 3/0056 (2013.01); G02B 6/0035 (2013.01); G02B 27/141 (2013.01)

(58) Field of Classification Search
CPC .. G02B 6/0016; G02B 6/0035; G02B 3/0056; G02B 27/141

(Continued)

(56) References Cited

U.S. PATENT DOCUMENTS

| 2,718,611 A | 9/1955 | McNaney et al. |
| 5,113,202 A | 5/1992 | Loce et al. |

(Continued)

FOREIGN PATENT DOCUMENTS

| SU | 339770 | 5/1972 |
| TW | 200528752 A | 9/2005 |

OTHER PUBLICATIONS

Kim "Holographic optical elements and application," In: Naydenova et al., editors, Holographic Materials and Optical Systems, InTech; 2017. pp. 99-131. IntechOpen Limited, The Shard, 25th floor 32 London Bridge Street, London, SE19SG—United Kingdom DOI: 10.5772/67297 http://dx.doi.org/10.5772/67297.

(Continued)

*Primary Examiner* — Daniel Petkovsek
(74) *Attorney, Agent, or Firm* — Michelle F. Murray; Charles A. Brill; Frank D. Cimino (57) ABSTRACT

Described examples include a display having a first light source configured to provide a first light and a second light source configured to provide a second light. The display also having a spatial light modulator configured to produce a first modulated light by modulating the first light and configured to produce a second modulated light by modulating the second light. The display also having a first diffractive optical element configured to receive the first modulated light and configured to provide a first image having a first characteristic to display optics; and a second diffractive optical element configured to receive the second modulated light and configured to provide a second image having a second characteristic to the display optics.

18 Claims, 8 Drawing Sheets

(58) Field of Classification Search
USPC .......................................................... 385/37
See application file for complete search history.

(56) References Cited

U.S. PATENT DOCUMENTS

| | | | |
|---|---|---|---|
| 5,485,304 A | 1/1996 | Kaeriyama | |
| 5,626,411 A | 5/1997 | Takahashi et al. | |
| 6,185,016 B1* | 2/2001 | Popovich | G02B 27/017 348/40 |
| 6,222,627 B1 | 4/2001 | Seitz et al. | |
| 6,542,282 B2 | 4/2003 | Smith et al. | |
| 6,856,446 B2 | 2/2005 | DiCarlo | |
| 6,897,991 B2 | 5/2005 | Huffman et al. | |
| 6,906,852 B1* | 6/2005 | Russell | G02B 27/1033 345/32 |
| 7,001,022 B2* | 2/2006 | Kim | G02B 27/0905 353/102 |
| 7,092,137 B2 | 8/2006 | Childers | |
| 7,106,491 B2 | 9/2006 | Meyer et al. | |
| 7,551,341 B1 | 6/2009 | Ward et al. | |
| 8,542,427 B2 | 9/2013 | Mehrl | |
| 9,709,802 B2 | 7/2017 | McDonald et al. | |
| 10,359,635 B2* | 7/2019 | Grey | G02B 6/0016 |
| 10,684,489 B2* | 6/2020 | Kroll | G02F 1/1347 |
| 10,768,516 B2* | 9/2020 | Bartlett | H04N 9/3152 |
| 10,809,664 B2* | 10/2020 | Seo | G03H 1/2294 |
| 2003/0002770 A1* | 1/2003 | Chakravorty | G02B 6/4214 385/14 |
| 2003/0039444 A1* | 2/2003 | Mossberg | G03H 1/28 385/37 |
| 2003/0063226 A1* | 4/2003 | Gibbon | G02B 27/143 348/771 |
| 2004/0046946 A1 | 3/2004 | Kim | |
| 2005/0013852 A1 | 1/2005 | Lee et al. | |
| 2005/0018309 A1 | 1/2005 | McGuire, Jr. et al. | |
| 2005/0105016 A1 | 5/2005 | Kurihara et al. | |
| 2005/0134805 A1 | 6/2005 | Conner et al. | |
| 2005/0207700 A1* | 9/2005 | Gruhlke | G02B 6/4206 385/37 |
| 2010/0079685 A1* | 4/2010 | Endo | C07D 401/14 348/761 |
| 2010/0097674 A1* | 4/2010 | Kasazumi | G03B 21/208 359/15 |
| 2010/0284090 A1* | 11/2010 | Simmonds | G02B 27/0172 359/630 |
| 2011/0014139 A1 | 1/2011 | Viala et al. | |
| 2011/0122467 A1 | 5/2011 | Futterer et al. | |
| 2011/0234985 A1 | 9/2011 | Ryf et al. | |
| 2012/0013852 A1 | 1/2012 | Champion et al. | |
| 2012/0327376 A1 | 12/2012 | Mehrl | |
| 2013/0170005 A1 | 7/2013 | Kurashige et al. | |
| 2015/0070749 A1 | 3/2015 | McDonald et al. | |
| 2015/0268546 A1 | 9/2015 | Huang | |
| 2016/0150225 A1 | 5/2016 | Kurashige | |
| 2016/0363869 A1 | 12/2016 | Hou | |
| 2018/0172893 A1* | 6/2018 | Fattal | G02B 6/0016 |
| 2018/0284460 A1* | 10/2018 | Cheng | G02B 27/1026 |
| 2019/0179149 A1* | 6/2019 | Curtis | G02B 30/24 |
| 2020/0045273 A1 | 2/2020 | Bartlett | |

OTHER PUBLICATIONS

Ando, "Head Mounted Display for Mixed Reality using Holographic Optical Elements," Mem. Fac. Eng., Osaka City Univ., vol. 40, pp. 1-6 (1999) Osaka City University, 3-3-138, Sugimoto, Sumiyoshi-ku, Osaka-shi, 558-8585. https://core.ac.uk/download/pdf/35262014.pdf.

Bigler, "Holographic waveguide heads-up display for longitudinal image magnification and pupil expansion," Applied Optics, vol. 57, No. 9, pp. 2007-13, (Mar. 20, 2018) OSA—The Optical Society, 2010 Massachusetts Ave., N.W., Washington, D.C. 20036-1012 USA https://doi.org/10.1364/AO.57.002007.

Piao, "Full Color Holographic Optical Element Fabrication for Waveguide-type Head Mounted Display Using Photopolymer," Journal of the Optical Society of Korea vol. 17, No. 3, Jun. 2013, pp. 242-248 OSA—The Optical Society, 2010 Massachusetts Ave., N.W., Washington, D.C. 20036-1012 USA DOI: http://dx.doi.org/10.3807/JOSK.2013.17.3.242.

International Search Report for PCT/US2019/055394 dated Dec. 5, 2019.

Hallstig, E., "Nematic Liquid Crystal Spatial Light Modulators for Laser Beam Steering," Comprehensive Summaries of Uppsala Dissertations from the Faculty of Science and Technology, 1048, Acad Upsaliensis Sigillum Fac Science, 2004, 72 pages.

Jiang, H.X., et al., "Nitride Micro-LEDs and Beyond—A Decade Progress Review," Optical Society of America, 2013, vol. 21, No. S3, Optics Express A475, 10 pages.

International Search Report and Written Opinion dated Oct. 31, 2019, PCT Application No. PCT/US2019/044354, 9 pages.

International Search Report dated Jan. 28, 2021, PCT Application No. PCT/US2020/055721, 10 pages.

* cited by examiner

OPTICAL DISPLAY WITH SPATIAL LIGHT MODULATOR

CROSS-REFERENCE TO RELATED APPLICATIONS

This application claims the benefit under 35 U.S.C. § 119(e) to co-owned U.S. Provisional Patent Application Ser. No. 62/729,202, filed Sep. 10, 2018, entitled "COMPACT ARCHITECTURES FOR NON-ACTUATOR XPR," which is hereby incorporated herein in its entirety by reference.

TECHNICAL FIELD

This relates generally to optical displays, and more particularly to examples to display systems using spatial light modulators.

BACKGROUND

Extended pixel resolution (XPR) is a technique used in spatial light modulator (SLM) projection displays where the displayed image has a higher resolution (greater pixel density) than the SLM used to generate the displayed image. An example technique for accomplishing two-way XPR is a moving plate. With this technique, a glass plate is interposed in the light path after the light has been modulated by the SLM. An actuator moves the plate so that, in one position, the output of the projector shifts by one-half pixel in both the x and y directions. This shift places the center of the shifted pixels at the intersection of four of the unshifted pixels. The output of the SLM alternates between the pixel information for unshifted and shifted pixels rapidly enough that the eye sees the combination of the unshifted and shifted pixels as an image having double the resolution of the SLM. This technique can be extended to 4-way XPR or arbitrarily-high resolution by moving to more sub-pixel positions (e.g. four). However, the optics and the actuator for the plate are not compact, thus this technique is not suitable for compact applications.

SUMMARY

In accordance with an example, a display includes a first light source configured to provide a first light and a second light source configured to provide a second light. The display also includes a spatial light modulator configured to produce a first modulated light by modulating the first light and configured to produce a second modulated light by modulating the second light. The display also includes a first diffractive optical element configured to receive the first modulated light and configured to provide a first image having a first characteristic to display optics; and a second diffractive optical element configured to receive the second modulated light and configured to provide a second image having a second characteristic to the display optics.

DETAILED DESCRIPTION

In the drawings, corresponding numerals and symbols generally refer to corresponding parts unless otherwise indicated. The drawings are not necessarily drawn to scale.

Figure 1:
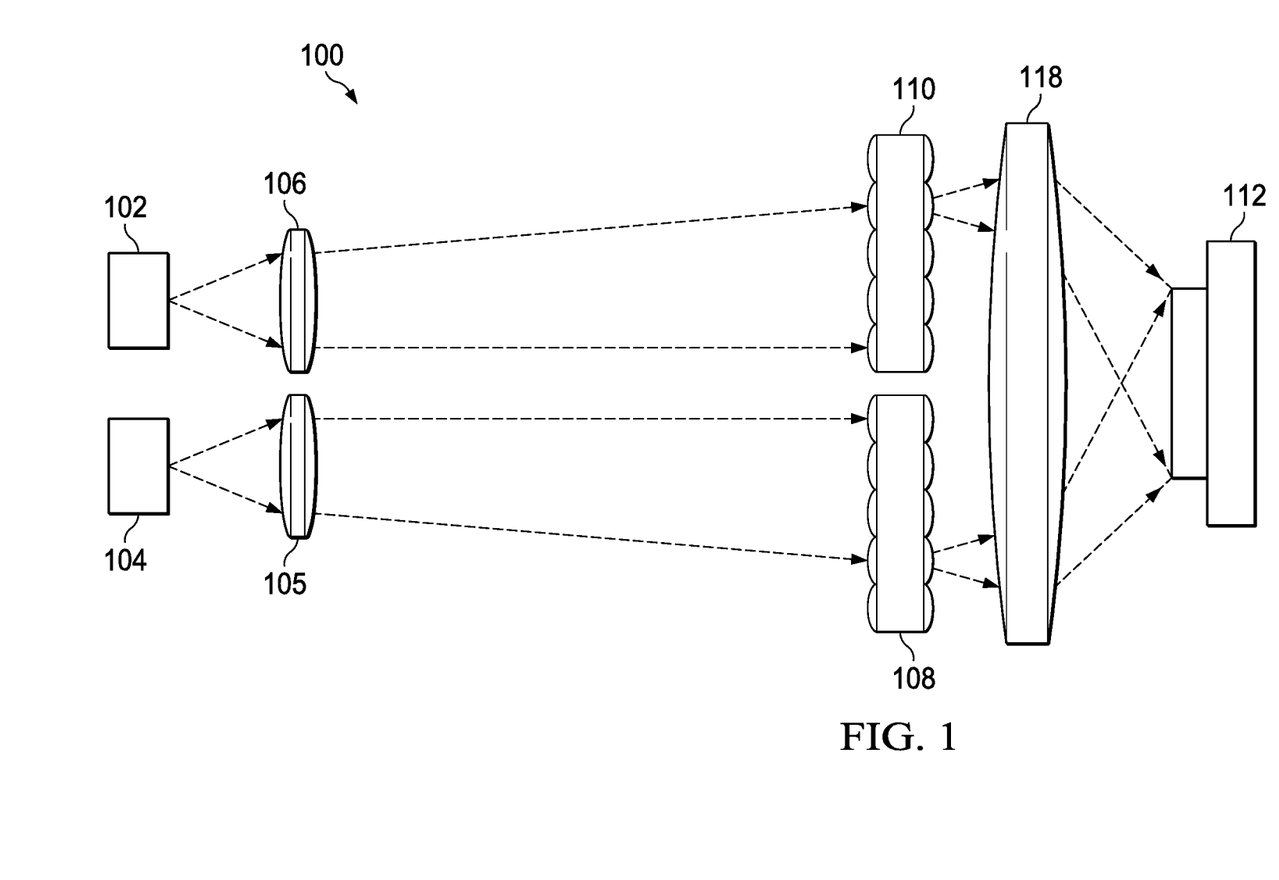
FIG. 1 is a schematic diagram of a light generation portion of an example projector.

FIG. 1 shows a light generation portion 100 of an example projector. Light source 102 and light source 104 may be LEDs, laser diodes or other high intensity light sources. In this example, light source 102 and light source 104 produce the same color light. For example, light source 102 and light source 104 may produce red for a red-green-blue (RGB) projection system. In other examples, light source 102 and light source 104 may produce white light and use a filtering system, such as a color wheel to produce the necessary colors for projection.

Light source 102 and light source 104 project through lenses 106 and 105, respectively. Lenses 105 and 106 may be a single lens or a system of lenses. Light projection lines in the figures are schematic and do not show the complete path of the light but show the general path of the light. Lenses 105 and 106 focuses the images of light sources 102 and 104, respectively, onto fly's eye array 108 and fly's eye array 110, respectively. Fly's eye array 108 and fly's eye array 110 include many small lenses. These arrays may include dozens or thousands of small lenses. The purpose of these lenses is to homogenize or "even out" the light to provide uniform light and eliminate the image of the light source. In the example of FIG. 1, two fly's eye arrays enhance the geometric separation of the two light paths from light source 102 and light source 104. However, one fly's eye array may be used for both paths in some examples. Lens 118 may be a single lens or a group of lenses. In this example, spatial light modulator (SLM) 112 is a digital micromirror device (DMD). Lens 106, fly's eye array 108, fly's eye array 110 and lens 118 preserve an angular difference to the light provided by light source 102 and light source 104 so that the light from light sources 102 and 104 addresses SLM 112 at different angles.

Figure 2:
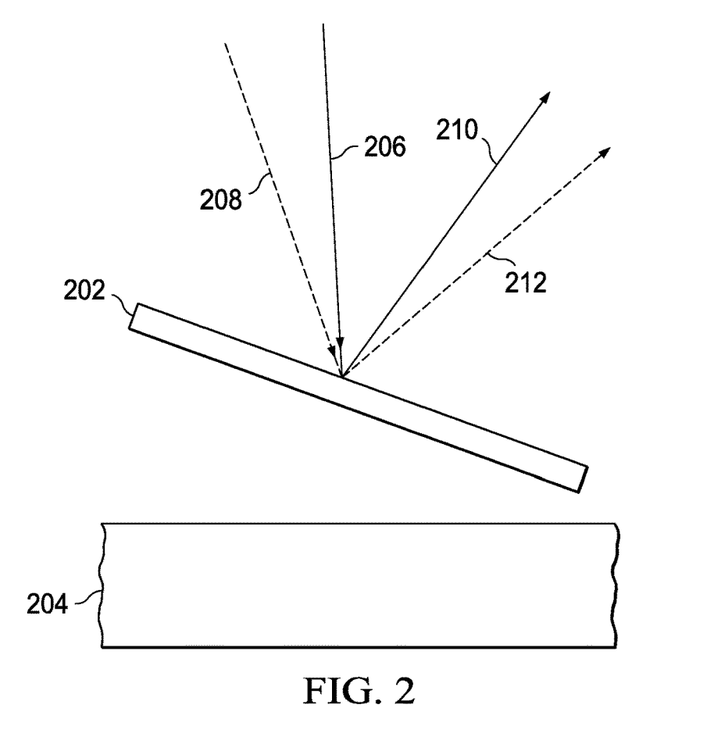
FIG. 2 is a diagram of one pixel of a spatial light modulator.

FIG. 2 shows one pixel of SLM 112 (FIG. 1). In this example, SLM 112 is a DMD. In another example, SLM 112 may be a liquid crystal on silicon (LCOS) modulator or another type of modulator. In an example, SLM 112 includes 2560×1600 (4,096,000) individually addressable mirrors. In FIG. 2, one mirror 202 is tilted in the ON position relative to substrate 204. The ON position is the position that reflects the incident light to projection optics. Other mirrors that are in the OFF position reflect the light away from projection optics. In this way, SLM 112 (FIG. 1) modulates the light to provide the desired image. This modulation is performed many times per image frame to provide desired shades and light intensity. As shown in FIG. 2, light 206 strikes mirror 202 at a different angle that light 208. In this example, light 206 is from light source 104 (FIG. 1) and light 208 is from light source 102 (FIG. 1). Mirror 202 is flat, so light 206 reflects as reflected light 210 at the angle of incidence of light 206 onto mirror 202. Similarly, light 208 reflects as reflected light 212 at the angle of incidence of light 208 onto mirror 202. Therefore, reflected light 210 and reflected light 212 leave SLM 112 (FIG. 1) at different angles.

Figure 3:
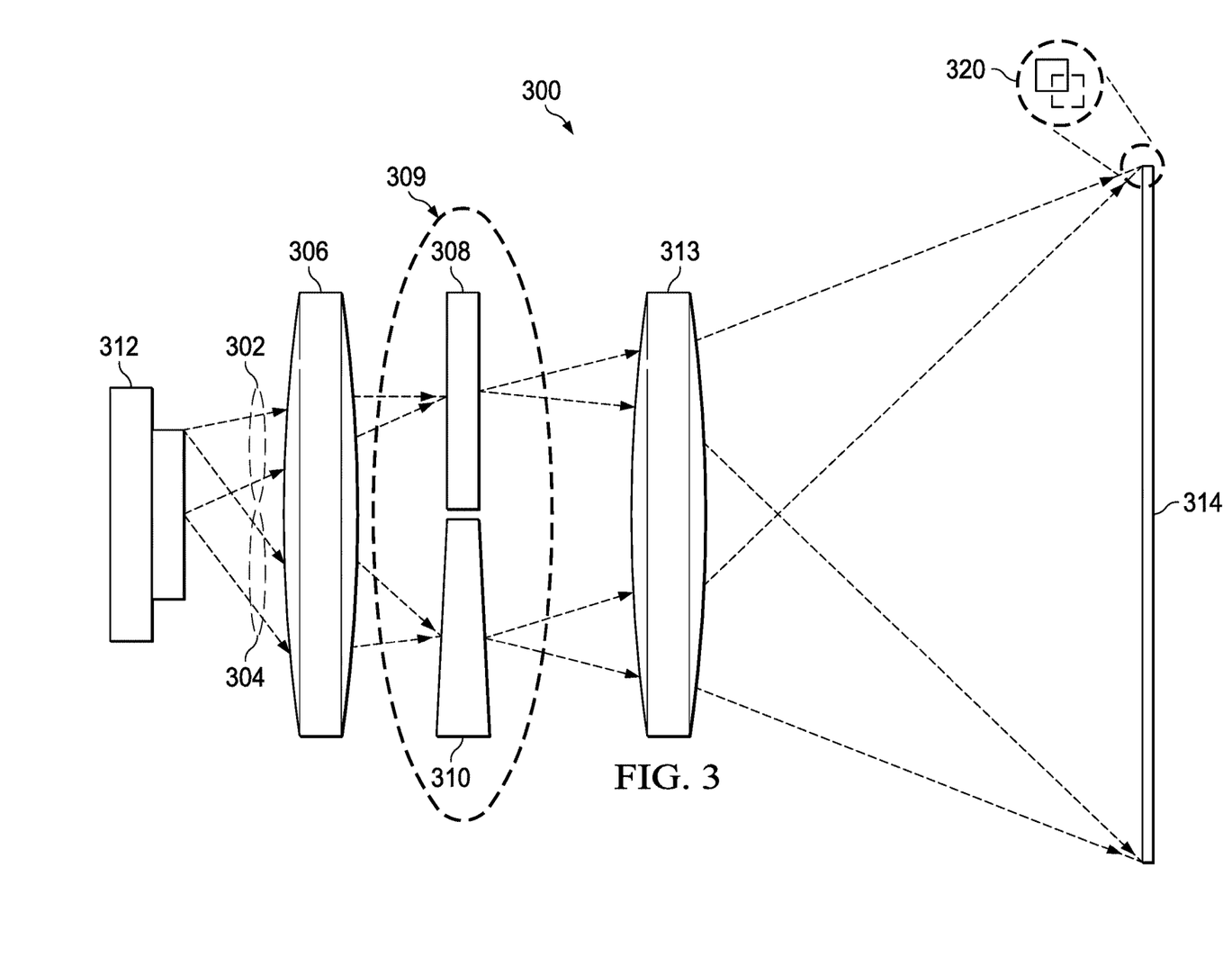
FIG. 3 is a schematic diagram of an image projection portion of an example projector.

FIG. 3 shows an image projection portion 300 of an example projector. SLM 312 is like SLM 112 (FIG. 1). Modulated light 302 is like reflected light 210 (FIG.) and modulated light 304 is like reflected light 212 (FIG. 2). Lens 306 focuses modulated light 302 onto plate 308. Lens 306 also focuses modulated light 304 onto plate 310. The combination of plate 308 and plate 310 provide an image direction device 309 that imparts a different pixel shift characteristic to modulated light 302 and modulated light 304. In this example, plate 308 is a flat glass plate that does not significantly modify the path of modulated light 302. In this example, plate 310 is a trapezoidal plate (also known as a wedge prism) that shifts the pixel position of modulated light 304 one-half pixel in the horizontal direction (x direction) and one-half pixel in the vertical direction (y direction). In other examples, plate 310 may be a tilted flat plate that provides the desired pixel shift. Lens 313 projects modulated light 302 from plate 308 and modulated light 304 from plate 310 onto target 314. In this example, target 314 is a projection screen. Inset 320 shows that target 314 displays overlapping pixels, as further explained hereinbelow.

Figure 4:
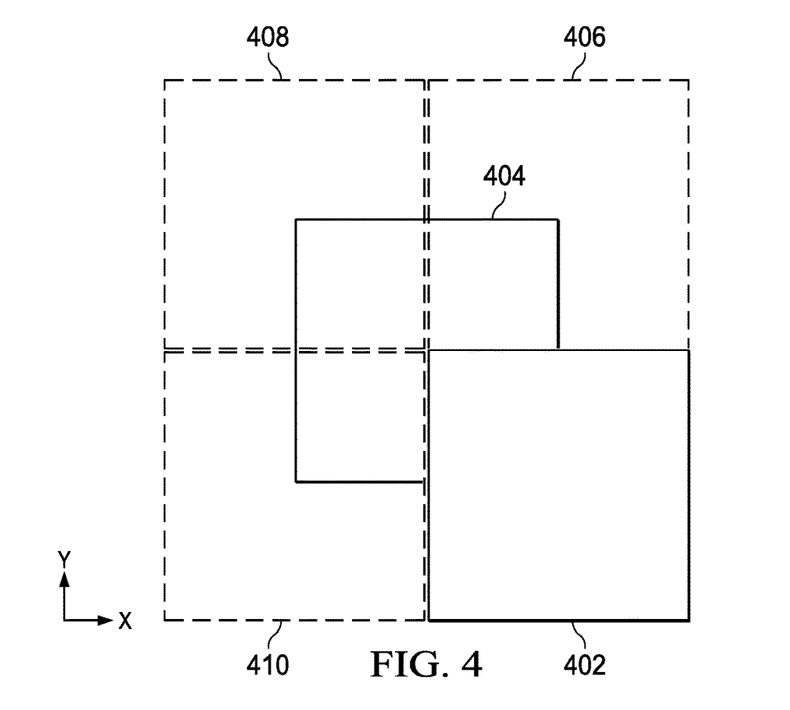
FIG. 4 is a diagram of the relative pixel position of two pixels.

FIG. 4 shows the relative pixel position of two pixels, one from modulated light 302 (FIG. 3) and one from modulated light 304 (FIG. 3). Pixel 402 is an unshifted pixel from modulated light 302 (FIG. 3). Pixel 404 is a shifted pixel from modulated light 304 (FIG. 3). In this example, pixel 404 is shifted one-half pixel in the positive y direction and one-half pixel in the negative x direction. Other examples may shift in different directions relative to the x/y axis as shown in FIG. 4. The center of pixel 404 is approximately at a corner of pixel 402. Pixels 406, 408 and 410 are pixels from modulated light 302 (FIG. 3) that are adjacent to pixel 402. The center of pixel 404 is at the corner of pixels 402, 406, 408 and 410 and equidistant from the center of those pixels. By alternating different modulations of modulated light 302 and modulated light 304 several times in a frame, the viewers eye integrates the two modulations and the image appears to have twice as many pixels as SLM 312. The example of FIGS. 1-4 achieves this alternation between modulations by alternately turning on and off light sources 102 and 104 (FIG. 1). Thus, this example achieves extended pixel resolution (XPR) without any mechanical pixel shifting device. In addition, because light sources 102 and 104 are only on for half of the time (50% duty cycle), power dissipation issues for these high intensity light sources are significantly eased. However, this example system is large and is not suitable for compact installations.

Figure 5:
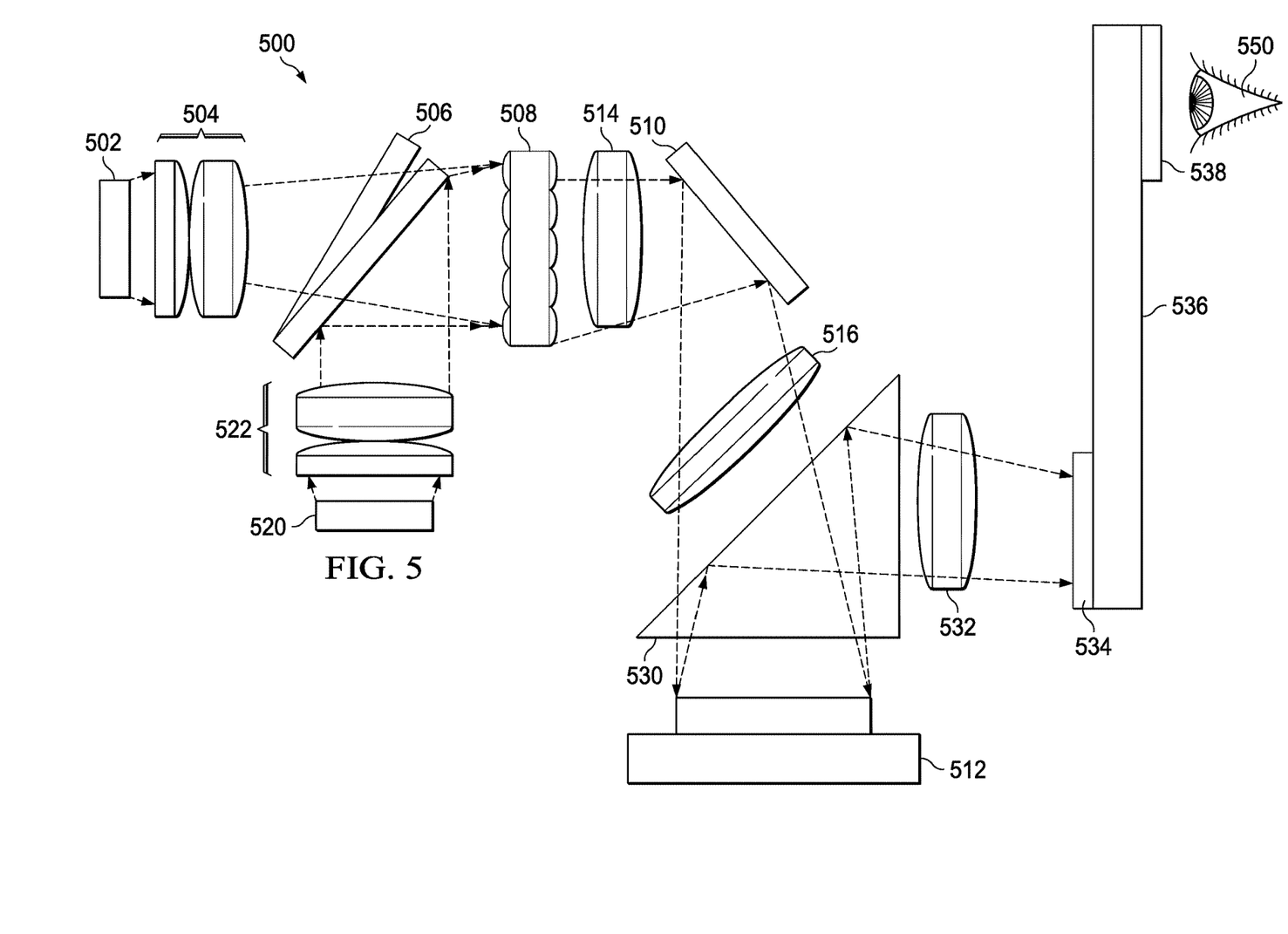
FIG. 5 is a schematic diagram of a compact display system.

FIG. 5 is a schematic diagram of a compact display system 500. In this example, compact display system 500 is a near-eye display (NED). Light source 502 is a green color light source. Lenses 504 collimate light from light source 502. Lenses 504 may be a single lens or multiple lenses. Light from lenses 504 passes through dichroic wedge 506 to fly's eye array 508. Mirror 510 reflects light from fly's eye array 508 to spatial light modulator 512. Lens 514 and lens 516 focus and size the light for the form factor of spatial light modulator 512. Each of lens 514 and 516 includes one or more lenses, in this example. Light source 520 is red color light source and a blue color light source. That is, light source 520 selectively provides red and/or blue light. Lenses 522 collimate light from light source 520. Lenses 522 may be a single lens or multiple lenses. Dichroic wedge 506 reflects light from lenses 522 to fly's eye array 508. The position of the red light source within light source 520 is different from the position of the green light source within light source 520. Therefore, the red dichroic mirror in dichroic wedge 506 is at a slightly different angle relative to the blue dichroic mirror in dichroic wedge 506 to align the light from the two different light sources in light source 520. Thus, dichroic wedge 506 has a wedge configuration and serves as a combiner of light from light source 502 and light source 520. As with light from light source 502, light from fly's eye array 508 homogenizes the light from light source 520. The light from fly's eye array 508 reflects off mirror 510 to spatial light modulator 512 through lens 514 and lens 516. Thus, light source 502 and light source 520 provide red, green and blue light to spatial light modulator 512. By timing of the provision of the red, green and blue light along with timing of the modulation of each pixel of spatial light modulator 512, compact display system 500 selectively produces colors from an entire color gamut at each pixel. In this example, spatial light modulator 512 is a digital micromirror device. In other examples, spatial light modulator is other devices, such as an LCOS spatial light modulator.

Because of the angle of incidence of the light from mirror 510 through lens 516, this light passes through total internal reflection (TIR) prism 530. ON light from spatial light modulator 512 reflects at an angle such that the ON light reflects off TIR prism 530 through lens 532 to diffractive optical element (DOE) 534. As used herein, "diffractive optical element" means a thin phase element that operates by means of interference and diffraction to produce arbitrary distributions of light or to aid in the design of optical systems. In this example, DOE 534 includes an imprinted pattern. The image passing through the patterns interferes with light passing through other portions of the pattern. The design of the pattern determines the effect on the image passing through the DOE and thus a characteristic of the image passing through the DOE. OFF light from spatial light modulator 512 reflects at an angle such that it passes through TIR prism 530 to a light sink (not shown). Thus, DOE 534 receives a modulated image.

Lens 532 provides the modulated image to DOE 534 as a "pupil image." That is, compact display system 500 is designed to project a focused image onto the back of eye 550, which the user perceives as an image in front of the user. The pupil image is the image provided at the pupil of the user to produce the desired image. However, the user's eye is not fixed. A waveguide 536, along with DOE 534 and DOE 538 serve as a pupil expander. That is, within a range of the pupil expander, wherever the user directs his/her eye, the pupil image is provided to the user's eye 550. Thus, waveguide 536 and DOE 538 serve as display optics. Compact display system 500 provides a compact system, but it is limited in resolution to the native resolution of spatial light modulator 512.

Figure 6:
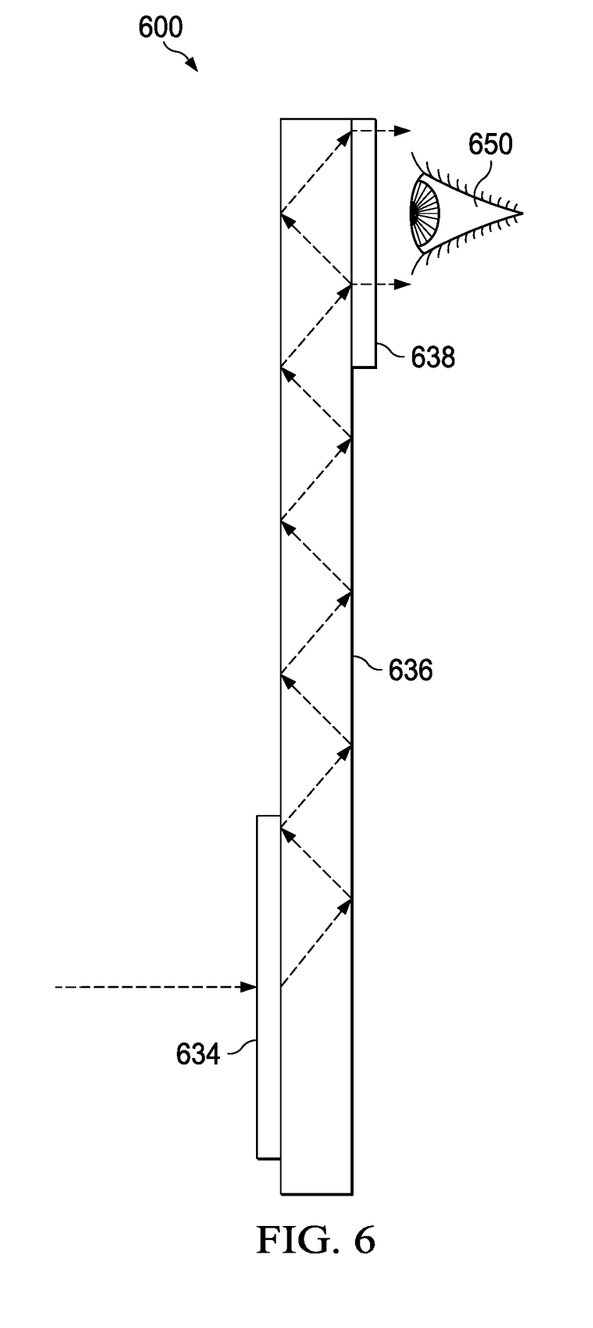
FIG. 6 is a schematic diagram of a pupil expander.

FIG. 6 is a schematic diagram of a pupil expander 600. Waveguide 636 includes a flat slab of transmissive glass or plastic and is like waveguide 536 (FIG. 5). Input DOE 634 and output DOE 638 have either a surface relief diffractive optical element or a holographic optical element (HOE) that is a volume hologram. Input DOE 634 and output DOE 638 are like DOE 534 and DOE 538, respectively. User's eye 650 is like user's eye 550 (FIG. 5). Light entering DOE 634 diffracts so that it reflects off the wall of waveguide 636 by total internal reflection. The output DOE 638 is imprinted with a diffractive or holographic pattern that splits the light into multiple pupil images, both vertically, which is the direction from the bottom to the top of the page of FIG. 6, and horizontally, which is into the page of FIG. 6. DOE 638 diffracts the light spread vertically and horizontally within waveguide 636 and thus extracts multiple pupil images. Ideally, the user receives a pupil image at every position of the user's eye relative to compact display system 500. For an example pupil expander see Bigler, et al., "Holographic Waveguide Heads-Up Display for Longitudinal Image Magnification and Pupil Expansion," pp. 2007-13, Vol. 57, No. 9, Applied Optics (20 Mar. 2018).

Figure 7:
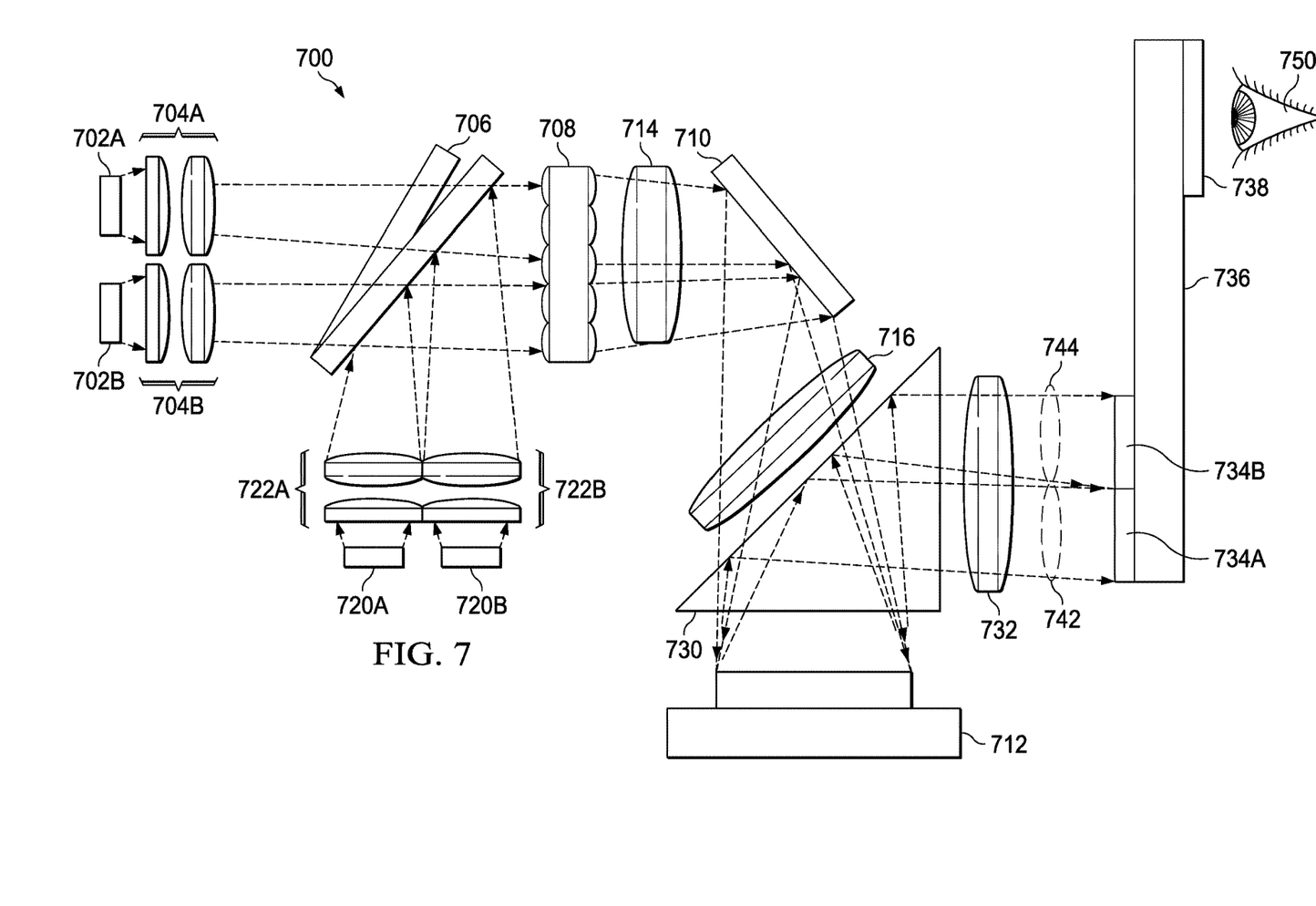
FIG. 7 is a schematic diagram of an example display.

FIG. 7 is a schematic diagram of an example display 700. In this example, display 700 is a near eye display (NED). Dichroic wedge 706 is like dichroic wedge 506 (FIG. 5). Fly's eye array 708 is like fly's eye array 508 (FIG. 5). Lens 714 and lens 716 are like lens 514 and lens 516, respectively (FIG. 5). Mirror 710 is like mirror 510 (FIG. 5). Spatial light modulator 712 is like spatial light modulator 512 (FIG. 5). TIR prism 730 is like TIR prism 530 (FIG. 5). Lens 732 is like lens 532 (FIG. 5), except that lens 732 is larger than lens 532, in an example. Waveguide 736 is like waveguide 536 (FIG. 5). DOE 738 is like DOE 538 (FIG. 5). Thus, waveguide 736 and DOE 738 serve as display optics. Light source 702A is a green color light source. Light source 702B is also a green color light source. Because of the different positions of light source 702A and light source 702B, the angle of the path of light from light source 702A and angle of the path of light from light source 702B are different relative to fly's eye array 708 and thus to the surface of spatial light modulator 712. Because fly's eye array 708 includes multiple lenses, fly's eye array 708 preserves this angle difference, as opposed to other light homogenizing devices, such light tubes. Light source 720A is a red color light source and a blue color light source. Light source 720B is also a red color light source and a blue color light source. Like light source 702A and light source 702B, the angle of the path of light from light source 720A and angle of the path of light from light source 720B are different relative to fly's eye array 708, and thus to the surface of spatial light modulator 712. As with dichroic wedge 506 (FIG. 5), dichroic wedge 706 serves as a combiner for the light from light source 702A and 720A, and as a combiner for the light from light source 702B and 720B.

The different angles of light from light source 702A versus light source 702B, and light source 720A versus light source 720B carry through to spatial light modulator 712. As shown in FIG. 2, this means that light modulated by spatial light modulator 712 from light source 702A and light source 720A takes path 742 to DOE 734A and light modulated by spatial light modulator 712 from light source 702B and light source 720B takes path 744 to DOE 734B. The angle of diffraction of DOE 734A and DOE 734B are different such that light from a pixel of spatial light modulator 712 that passes through DOE 734B is shifted one half pixel vertically and one half pixel horizontally relative to the same pixel that passes through DOE 734A. The positions of DOE 734A and DOE 734B on waveguide 736 are such that the images from DOE 734A and DOE 734B take the same path, and thus each pupil image includes the images from both DOE 734A and DOE 734B. Thus, modified modulated light from path 742 and path 744 are combined onto the same path in waveguide 736. By alternately using light source 702A and light source 702B, and by alternately using light source 720A and 720B, the output image as perceived by the user's eye 750 through waveguide 736 and DOE 738 has doubled the resolution of the resolution provided natively by spatial light modulator 712. The example of FIG. 7 uses twice the light sources of the system of FIG. 5 to double the perceived resolution. However, additional light sources, such as four or six per color, may be used to further enhance the perceived resolution.

Figure 8:
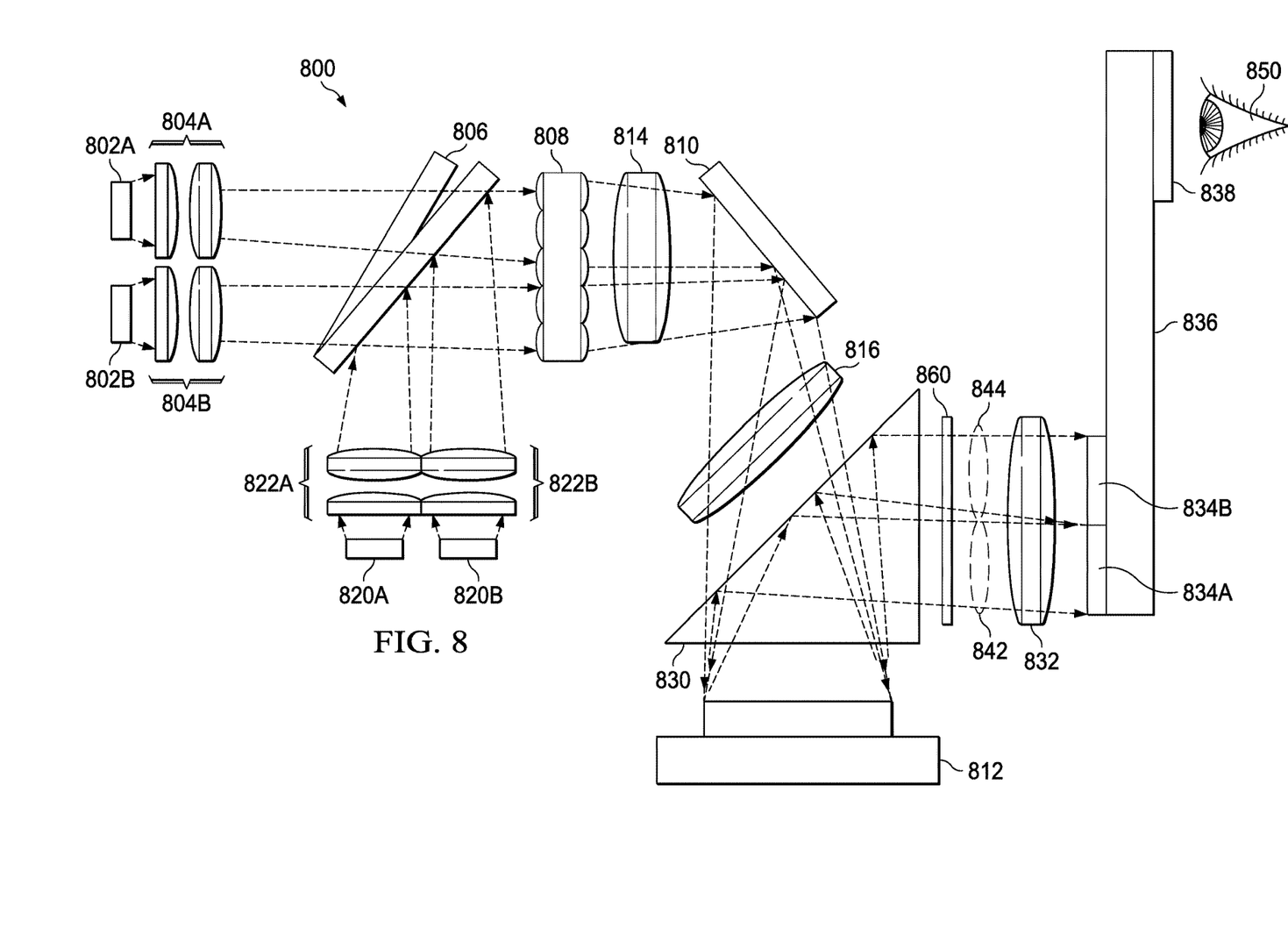
FIG. 8 is a schematic diagram of another example display.

FIG. 8 is a schematic diagram of another example display 800. In this example, display 800 is a near eye display (NED). Light source 802A and light source 802B are like light source 702A and light source 702B (FIG. 7), respectively. Light source 820A and light source 820B are like light source 720A and light source 720B (FIG. 7), respectively. Lenses 804A and lenses 804B are like lenses 704A and lenses 704B (FIG. 7), respectively. Lenses 822A and lenses 822B are like lenses 722A and lenses 722B (FIG. 7), respectively. Dichroic wedge 806 is like dichroic wedge 706 (FIG. 7). Fly's eye array 808 is like fly's eye array 708 (FIG. 7). Lens 814 and lens 816 are like lens 714 and lens 716, respectively (FIG. 7). Mirror 810 is like mirror 710 (FIG. 7). Spatial light modulator 812 is like spatial light modulator 712 (FIG. 7). TIR prism 830 is like TIR prism 730 (FIG. 7). Lens 832 is like lens 732 (FIG. 7). Waveguide 836 is like waveguide 736 (FIG. 7). DOE 838 is like DOE 738 (FIG. 7). Thus, waveguide 836 and DOE 838 serve as display optics. As with the example of FIG. 7, light from light source 802A and light source 802B takes path 842 through DOE 834A, through waveguide 836 and DOE 838 to the user's eye 850. Similarly, light source 820A and light source 820B take takes path 844 through DOE 834B, through waveguide 836 and DOE 838 to the user's eye 850. In addition to the pixel shift provided by DOE 834B, plate 860 may be mechanically actuated to shift the image provided to either or both of DOE 834A and DOE 834B. Thus, example display 800 can double the perceived resolution of the output image relative to the example display 700 (FIG. 7).

Figure 9:
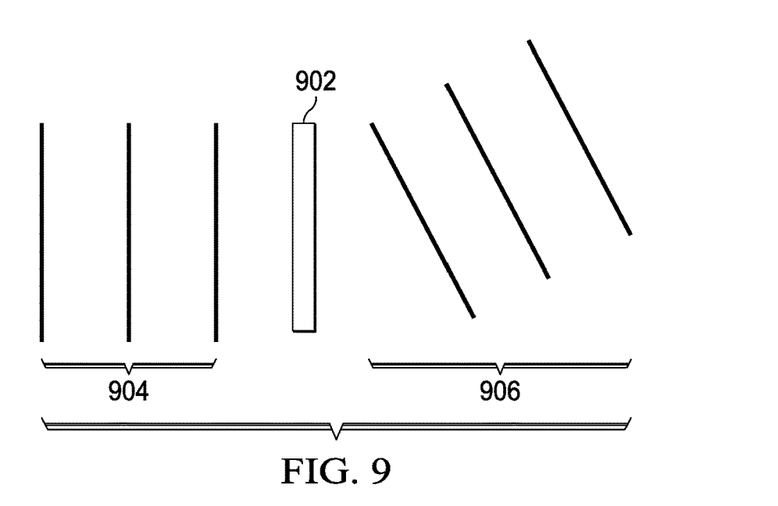
FIG. 9 is a diagram showing the operation of a diffractive optical element (DOE).
Figure 10:
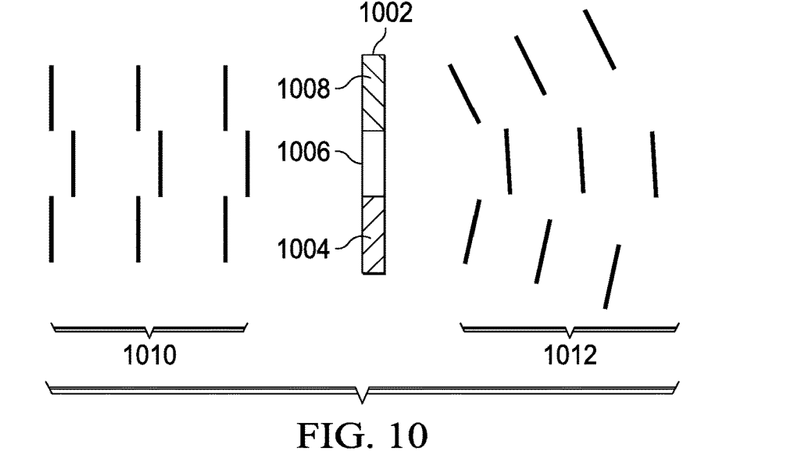
FIG. 10 is a diagram showing the operation of another DOE.

FIG. 9 is a diagram showing the operation of DOE 902. Light 904 enters DOE 902 at an angle. In this case, the angle is perpendicular to DOE 902. Because of the pattern and spacing of the pattern in DOE 902, light 904 exits DOE 902 as light 906, which has a different angle. FIG. 10 is another example DOE 1002. Light 1010 enters DOE 1002 and light 1012 exits DOE 1002. DOE 1002 includes pattern 1004, pattern 1006 and pattern 1008. The different patterns of DOE 1002 have different effects on exiting light 1012. DOE 1002 may be used to replace both DOE 734A and DOE 734B (FIG. 7), for example.

Figure 11:
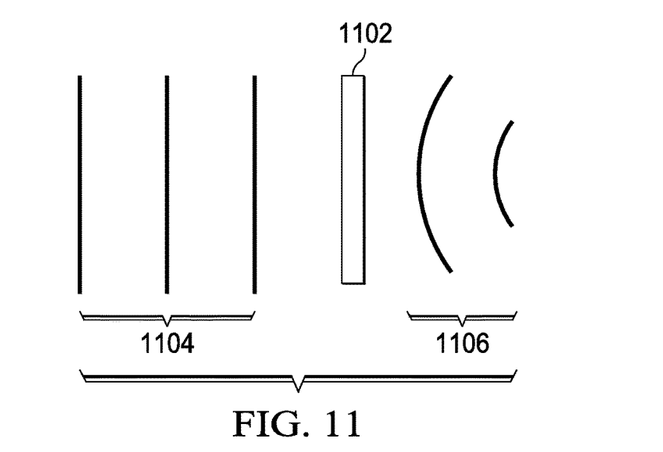
FIG. 11 is a diagram showing the operation of another DOE.

FIG. 11 is another example DOE 1102. DOE 1102 in this example has an optical power. That is, it affects the focal distance of the image 1104 passing through DOE 1102 as image 1106. Using a DOE like DOE 1102, the examples of FIGS. 7 and 8 can be modified to provide a multifocal display. Multifocal displays are used to reduce eye fatigue with three-dimensional stereoscopic displays. When viewing an object in three dimensions in a stereoscopic display, the eyes perform two functions simultaneously. First, the eyes focus at the distance of the image from the eyes. This is called focal distance. In traditional stereoscopic devices, the display is a fixed optical distance from the eyes. The eyes must focus on the display, so the focal distance is constant. Second, the eyes move to an angle commensurate with the perceived distance of the object. This is called vergence distance. The vergence distance varies with the perceived position of an object on the display. Thus, with stereoscopic technology, the images themselves are at one distance but the perceived distance of the object may be at another distance. This causes viewer fatigue. It is particularly a problem with virtual reality goggles because the focal distance may be a short distance.

To mitigate this problem, the three-dimensional image is broken up into focal planes with each plane displayed at a different focal distance. Using DOEs with optical power like DOE 1102, each focal plane can be directed to a DOE with the optical power that corresponds to the focal distance of that focal plane. A set of light sources, such as light source 702A and 720A, is provided for each focal plane. Thus, a multifocal display is provided that requires no mechanical means to change the focus of the planes of the displayed image.

Modifications are possible in the described examples, and other examples are possible, within the scope of the claims.

What is claimed is:

1. An apparatus comprising:
   a first light source configured to produce first light having a first color;
   a second light source configured to produce second light having a second color, the second color the same as the first color;
   a first diffractive optical element;
   a second diffractive optical element; and
   a spatial light modulator optically coupled to the first light source, to the second light source, to the first diffractive optical element, and to the second diffractive optical element, the spatial light modulator configured to:
      receive the first light;
      receive the second light;
      produce first modulated light by modulating the first light;
      produce second modulated light by modulating the second light;
      direct the first modulated light towards the first diffractive optical element and away from the second diffractive optical element; and
      direct the second modulated light towards the second diffractive optical element and away from the first diffractive optical element;
   wherein the first diffractive optical element is configured to:
      receive the first modulated light; and
      provide a first image; and
   wherein the second diffractive optical element configured to:
      receive the second modulated light; and
      provide a second image offset from the first image.

2. The apparatus of claim 1, wherein the first diffractive optical element has a first optical power and the second diffractive optical element has a second optical power, the second optical power different than the first optical power.

3. The apparatus of claim 1, further comprising display optics configured to receive the first image and the second image, wherein the display optics comprises:
   a waveguide; and
   a third diffractive optical element configured to extract the first and second images from the waveguide.

4. The apparatus of claim 3, wherein the third diffractive optical element is a holographic optical element.

5. The apparatus of claim 3, further comprising a fourth diffractive optical element on the waveguide.

6. The apparatus of claim 1, further comprising a fly's eye array optically coupled between the first light source and the spatial light modulator, and between the second light source and the spatial light modulator.

7. The apparatus of claim 1, wherein the apparatus is a near eye display.

8. The apparatus of claim 1, wherein the second image is offset from the first image by half a pixel.

9. The apparatus of claim 1, wherein during a first time period, the first light source is configured to produce the first light and the second light source is configured not to produce the second light, and during a second period of time the first light source is configured not to produce the first light and the second light source is configured to produce the second light.

10. The apparatus of claim 1, wherein the second light source is spatially offset from the first light source.

11. The apparatus of claim 1, further comprising a dichroic wedge coupled between the first light source and the spatial light modulator, and between the second light source and the spatial light modulator.

12. The apparatus of claim 11, further comprising:
    a third light source optically coupled to the dichroic wedge, the third light source configured to produce third light have a third color different than the first color; and
    a fourth light source optically coupled to the dichroic wedge, the fourth light source configured to produce fourth light having a fourth color, the fourth color the same as the third color.

13. The apparatus of claim 12, wherein the dichroic wedge is configured to:
    transmit the first light to the spatial light modulator;
    transmit the second light to the spatial light modulator;
    reflect the third light to the spatial light modulator; and
    reflect the fourth light to the spatial light modulator.

14. The apparatus of claim 12, wherein the first color comprises green light and the third color comprises red light and blue light.

15. The apparatus of claim 1, further comprising a plate optically coupled to the spatial light modulator, wherein the plate is configured to be actuated.

16. The apparatus of claim 1, wherein the first diffractive optical element comprises a surface relief diffractive optical element.

17. The apparatus of claim 1, wherein the first diffractive optical element comprises a volume hologram.

18. The apparatus of claim 1, wherein the first light impinges the spatial light modulator at a first angle and the second light impinges the spatial light modulator at a second angle, the second angle different than the first angle.

* * * * *